United States Patent
Parron et al.

(10) Patent No.: US 11,863,983 B2
(45) Date of Patent: Jan. 2, 2024

(54) PROVISIONING OF VLAN IDS IN 5G SYSTEMS

(71) Applicant: Apple Inc., Cupertino, CA (US)

(72) Inventors: Jerome Parron, Furth (DE); Sudeep Manithara Vamanan, Nuremberg (DE); Ana Lucia Pinheiroe, Plano, TX (US)

(73) Assignee: Apple Inc., Cupertino, CA (US)

( * ) Notice: Subject to any disclaimer, the term of this patent is extended or adjusted under 35 U.S.C. 154(b) by 486 days.

(21) Appl. No.: 17/267,335

(22) PCT Filed: Aug. 20, 2019

(86) PCT No.: PCT/US2019/047341
§ 371 (c)(1),
(2) Date: Feb. 9, 2021

(87) PCT Pub. No.: WO2020/041368
PCT Pub. Date: Feb. 27, 2020

(65) Prior Publication Data
US 2021/0345113 A1    Nov. 4, 2021

Related U.S. Application Data

(60) Provisional application No. 62/720,024, filed on Aug. 20, 2018.

(51) Int. Cl.
*H04L 67/14* (2022.01)
*H04W 12/08* (2021.01)
(Continued)

(52) U.S. Cl.
CPC ......... *H04W 12/08* (2013.01); *H04L 12/4675* (2013.01); *H04L 67/14* (2013.01); *H04W 12/02* (2013.01)

(58) Field of Classification Search
None
See application file for complete search history.

(56) References Cited

U.S. PATENT DOCUMENTS

| 2002/0009078 A1 | 1/2002 | Wilson et al. |
| 2008/0101240 A1 | 5/2008 | Mandeep et al. |

(Continued)

FOREIGN PATENT DOCUMENTS

| JP | 2006345088 A | 12/2006 |
| WO | 2015183415 A1 | 12/2015 |

(Continued)

OTHER PUBLICATIONS

International Search Report dated Dec. 6, 2019 for International Application No. PCT/US2019/047341.

(Continued)

*Primary Examiner* — Nelson S. Giddins
(74) *Attorney, Agent, or Firm* — Eschweiler & Potashnik, LLC (57) ABSTRACT

In one embodiment, a New Radio (NR) core network system comprises a set of network functions to: receive a request from a user equipment (UE) device comprising a virtual local area network data network name (VLAN DNN); determine whether the UE device is authorized to access a particular VLAN implemented on the core network and associated with the VLAN DNN; and cause a message comprising a VLAN identifier (VLAN ID) to be transmitted to the UE device based on a determination that the UE device is authorized to access the particular VLAN, wherein the VLAN ID corresponds to the particular VLAN.

15 Claims, 6 Drawing Sheets

(51) Int. Cl.
*H04L 12/46* (2006.01)
*H04W 12/02* (2009.01)

(56) References Cited

U.S. PATENT DOCUMENTS

| | | | |
|---|---|---|---|
| 2015/0358889 A1 | 12/2015 | Arora et al. | |
| 2016/0127891 A1 | 5/2016 | Nylander et al. | |
| 2019/0159024 A1* | 5/2019 | Rost | H04W 12/0433 |
| 2019/0268973 A1* | 8/2019 | Bull | H04W 92/02 |
| 2020/0059856 A1* | 2/2020 | Cui | H04W 24/02 |

FOREIGN PATENT DOCUMENTS

| | | | |
|---|---|---|---|
| WO | 2015183859 A1 | 12/2015 |
| WO | 2016078325 A1 | 5/2016 |
| WO | 2018084593 A1 | 11/2018 |

OTHER PUBLICATIONS

"Solution for how to support 5G LAN group communication." Source: vivo. Agenda Item: 6.15. SA WG2 Meeting #128-bis, Aug. 20-24, 2018, Sophia Antipolis, France. S2-187937.

"Solution for support of 5G LAN-type service and 5GLAN communication." Source: Intel. Agenda Item: 6.15. SA WG2 Meeting #128-BIS, Aug. 20-24, 2018, Sophia Antipolis, France, S2-187743.

Qiang et al., "Architecture and Key Technologies of 5G Transport Network Slicing", In ZTE Technology Journal, vol. 24, No. 1, Feb. 2018, pp. 58-61.

Qualcomm Incorporated; "Support for VLAN ID learning to enable IEEE 802.1CB (Frame Replication and Elimination for Reliability) combined with IEEE 802.1Q" SA WG2 Meeting #128; S2-186431; Jul. 2, 2018.

Qualcomm Incorporated; "Support for VLAN ID learning to enable IEEE 802.1CB (Frame Replication and Elimination for Reliability) combined with IEEE 802.1Q"; SA WG2 Meeting #128; S2-187317; Jul. 2, 2018.

3rd Generation Partnership Project; Technical Specification Group Services and System Aspects; Procedures for the 5G System; Stage 2 (Release 15); 3GPP TS 23.502 V15.2.0; Jun. 2018.

3rd Generation Partnership Project; Technical Specification Group Core Network and Terminals; Mobile radio interface Layer 3 specification; Core network protocols; Stage 3 (Release 15); 3GPP TS 24.008 V15.3.0; Jun. 2018.

Digital cellular telecommunications system (Phase 2+) (GSM); Universal Mobile Telecommunications System (UMTS); Numbering, addressing and identification (3GPP TS 23.003 version 15.4.0 Release 15); ETSI TS 123 003 V15.4.0; Jul. 2018.

5G; System Architecture for the 5G System (3GPP TS 23.501 version 15.2.0 Release 15); ETSI TS 123 501 V15.2.0; Jun. 2018.

5G; NG-RAN; Architecture description (3GPP TS 38.401 version 15.2.0 Release 15); ETSI TS 138 401 V15.2.0; Jul. 2018.

* cited by examiner

PROVISIONING OF VLAN IDS IN 5G SYSTEMS

CROSS REFERENCE TO RELATED APPLICATIONS

This application is a National Phase entry application of International Patent Application No. PCT/us2019/047341 filed Aug. 20, 2019, which claims priority to U.S. Provisional Patent Application 62/720,024 filed on Aug. 20, 2018, entitled "PROVISIONING OF VLAN IDs IN 5G SYSTEMS" and is hereby incorporated by reference in its entirety.

TECHNICAL FIELD

This disclosure generally relates to provisioning of virtual local area network (VLAN) identifiers (IDs) in the field of wireless communications.

BACKGROUND

Currently there is no process for dynamically allocating an IEEE 802.1Q virtual local area network identifier (VLAN ID) to user equipment (UE) devices in wireless communication networks, such as third generation (3G), fourth generation (4G), or upcoming fifth generation (5G) networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

The third generation partnership project (3GPP) has started an architecture study ("the study") on the fifth generation cellular technology's (5G's) enhanced support of Vertical and local area network (LAN) services, for example by way of 3GPP's Technical Report (TR) 23.734 V.0.1.0. As part of the study, the following definitions were agreed to be relevant, and are relevant with respect to the present disclosure. A "5GLAN Group" may refer to a set of UEs using private communication for 5G LAN-type service, "5G LAN-type service" may refer to service over the 5G system offering private communication using IP and/or non-IP type communications, "private communication" may refer to communication between two or more UEs belonging to a restricted set of UEs, "5GLAN one to one communication" may refer to communication between two UEs in a 5GLAN group, and "5GLAN one to many communication" may refer to communication between one UE and many UEs in a 5GLAN group.

The study provides the following relevant key issues to be studied at section 5.4.1.1: (1) the system architecture and procedure supporting service exposure for creation and management of a 5GLAN Group; (2) how the 5G system creates a 5GLAN Group for private communication; (3) how the 5G system identifies a 5GLAN Group for private communication; (4) how the UE is added into a 5GLAN Group, e.g. based on the request from an Application Function, including the authentication and authorization of UE to join a 5GLAN Group; (5) how the 5G system removes a UE from a 5GLAN Group, e.g. based on the request from an Application Function; and (6) how the 5G system removes a 5GLAN Group.

The study provides the following relevant key issues to be studied at section 5.4.2.1: (1) how to identify a 5GLAN service; (2) whether and how the 5GS network provides the required information to a UE and what the required information to support 5GLAN service discovery; (3) what the procedure and criteria are for a UE to perform 5GLAN service discovery and selection; (4) what the granularity is for 5GLAN service restriction, e.g. per UE, per 5GLAN group, per UE's location information, or other information and combination of such information; (5) how the 5GS network configures and enforces service restriction for a UE from 5GLAN; (6) whether and how the 5GS network enforces respective service restrictions on a UE using multiple 5GLAN services without conflicts.

The study provides the following relevant key issues to be studied at section 5.5.1: (1) how to authorize a UE for 5GLAN communication; (2) how to support service exposure function for AF managing 5GLAN communications; (3) how to support the one to one or one to many data communication for 5GLAN communication service within a single 5GLAN group, the procedure to establish, modify, and release the one to one and one to many 5GLAN communication; (4) how to know the UE reachability status for 5GLAN communication; (5) how to keep the service continuity for 5GLAN communication due to UE mobility within the same PLMN; (6) how to address the UE within the 5GLAN group for 5GLAN communication; (7) how to ensure isolation of 5GLAN communication between 5GLAN groups; and (8) how to secure the 5GLAN one to one and one to many communication. For Ethernet-type 5GLAN communication, the following aspects may also be for study: (1) how to support the Ethernet transport service of the 5GLAN group over wide area mobile network; and (2) how to route the Ethernet frames efficiently between UEs within a 5GLAN group.

Embodiments herein provide 5G LAN-type service and 5GLAN communication over the 5G System. According to various embodiments, the 5GLAN service may enable private communication among UEs that are members of the 5GLAN. The 5GLAN service is a service that provides exchange of protocol data units (PDUs) among all UE members. A typical deployment scenario for a VLAN is an enterprise VLAN.

Embodiments herein address how a UE could be provisioned with the VLAN identification (ID) (VLAN ID) for which it wants to establish a protocol data unit (PDU) session (PDU Session) enabling access to 5G LAN services. According to some embodiments, a logical entity referred to as a "VLAN Function" in the core network manages the authorization of allowing UEs to access a VLAN, The VLAN function may be a distinct logical entity in the core network, or may be integrated with (or part of) a user plane function (UPF) in the core network. Embodiments herein are related to how the UE discovers the VLAN function within a public land mobile network (PLMN) and how it is gets the VLAN ID for the enterprise VLAN to which it plans to connect. In particular, the embodiments herein provide mechanisms for a dynamic configuration that may be more suitable for a use case where "on-demand" VLAN ID is to be allocated.

IEEE 802.1Q is the networking standard that supports virtual LANs (VLANs) on an IEEE 802.3 Ethernet network. Currently, there are no methods to dynamically allocate an Institute of Electrical Engineering (IEEE) 802.1Q, VLAN ID to a UE to enable the UE to access a VLAN network using Ethernet over 5G. Instead, only manual configuration is possible leading to a huge effort when VLAN over 5G is scaled for a large number of devices.

Embodiments herein provide mechanisms to dynamically obtain the data network name (DNN) associated to a VLAN network, and dynamically allocate to the UE one or more IEEE 802.1Q VLAN IDs to access a VLAN network. Without these embodiments the IEEE 802.1Q VLAN ID would have to be configured manually in the UE, which is a huge effort and prone to errors.

Figure 4:
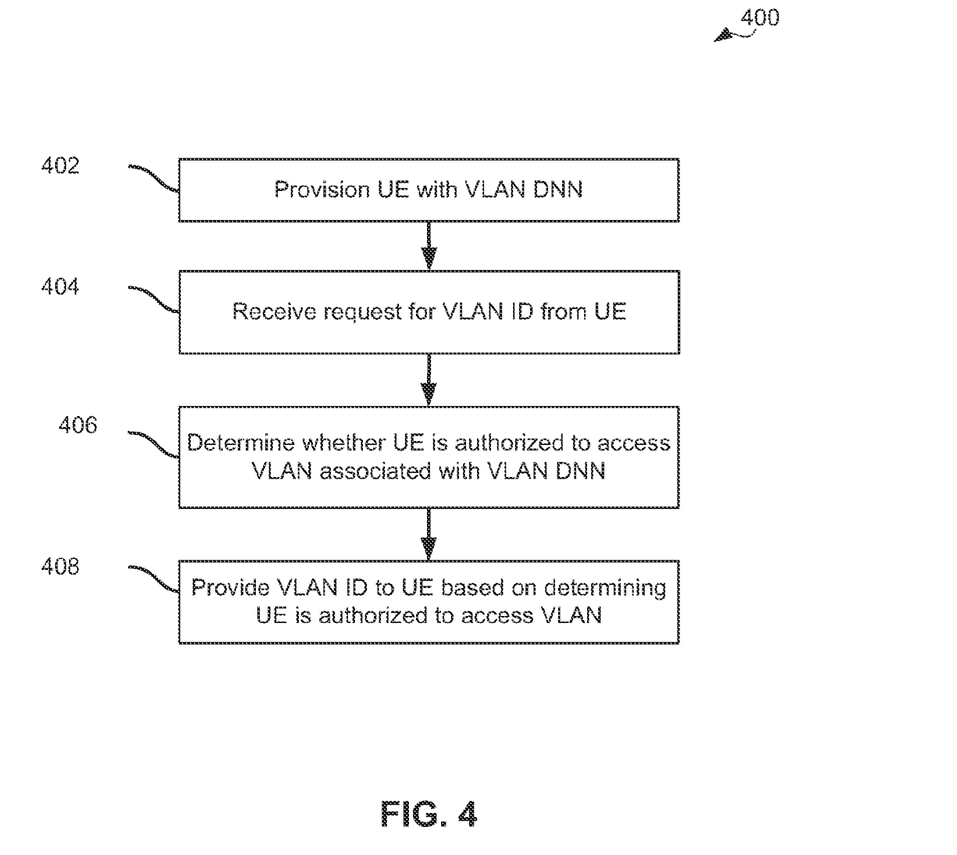
FIG. 4 illustrates an example process for providing a VLAN ID to a UE device according to various embodiments.
Figure 5:
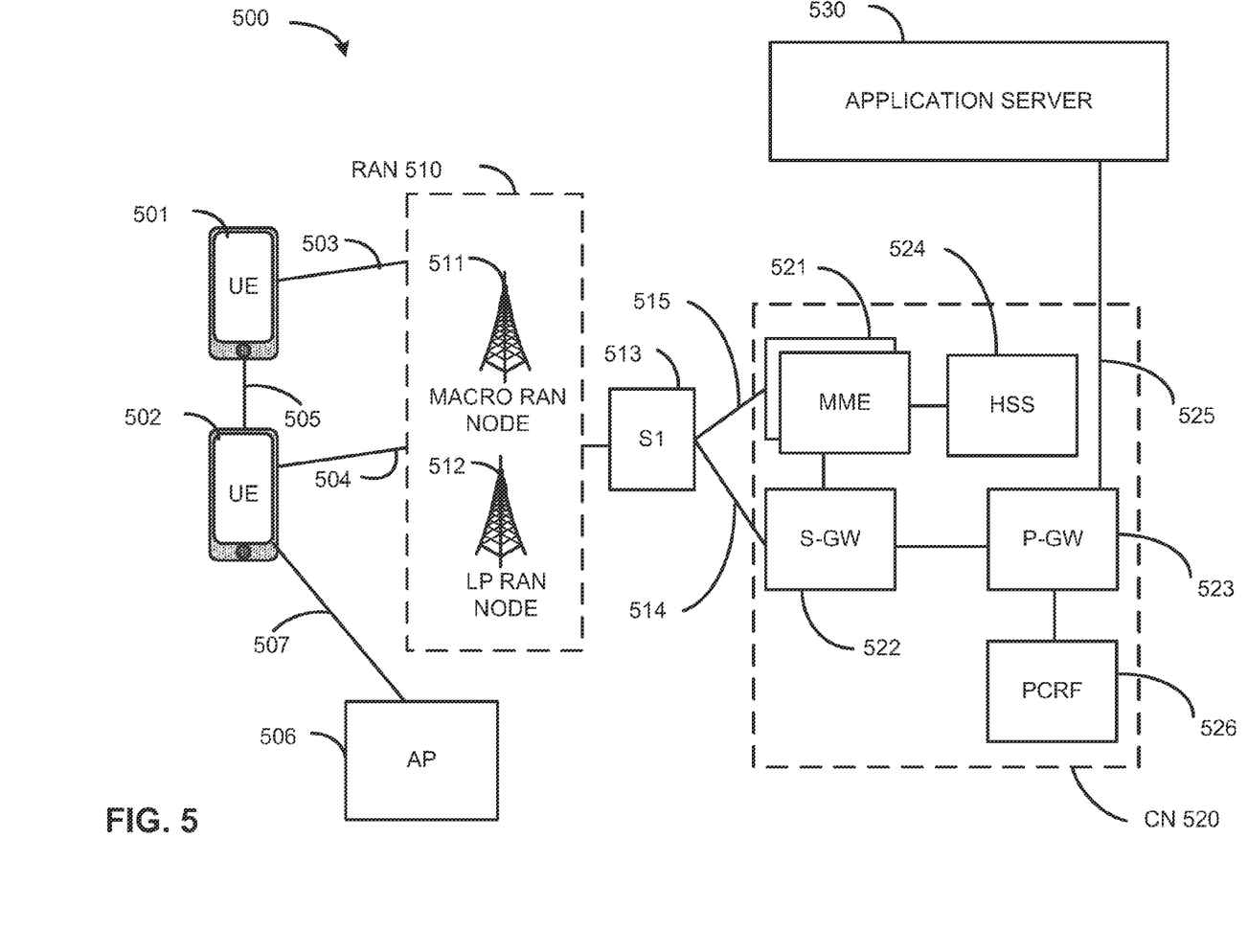
FIG. 5 illustrates an example architecture of a system of a network in accordance with some embodiments.

According to some embodiments, a VLAN function is deployed in the network (e.g., the networks shown and described with regard to FIGS. 4, 5, and/or 5). The VLAN function may be implemented as an individual network function (NF), application function (AF), network node, etc., or the VLAN function may be implemented as part of an existing node, such as a mobility management entity (MME) in an evolved packet core (EPC) MME 521 in core network (CN) 520 of FIG. 5) or an access and mobility management function (AMF) in a 5G Core network (5GC) (e.g., AMF 621 in CN 620 of FIG. 6), and/or some other suitable entity. The VLAN function may be responsible for configuring an association between the UE and a specific VLAN. VLANs are assigned a VLAN ID, and some or all members of a VLAN communicate using a group multicast (e.g., any message sent in a VLAN has to be sent to all members of that VLAN, and only to the members of that ULAN). The VLAN Function may also be responsible for the management of associations between DNNs and VLAN IDs (or VLAN Tag), and the VLAN function performs the mapping for all VLANs which are associated with DNNs. In a typical enterprise VLAN scenario, a DNN may be associated with one or more VLAN IDs indicating different possible VLANs within an enterprise (e.g., for individual users, for peripherals, compute farms, etc. of the enterprise). For establishing a PDU session associated to a VLAN, the UE is to obtain the VLAN ID (or VLAN Tag). According to various embodiments, a given DNN could have up to 4096 VLANs corresponding to 4095 VLAN identifiers. For VLANs associated with DNNs, the VLAN ID is only unique within that DNN of the PLMN.

Figure 1:
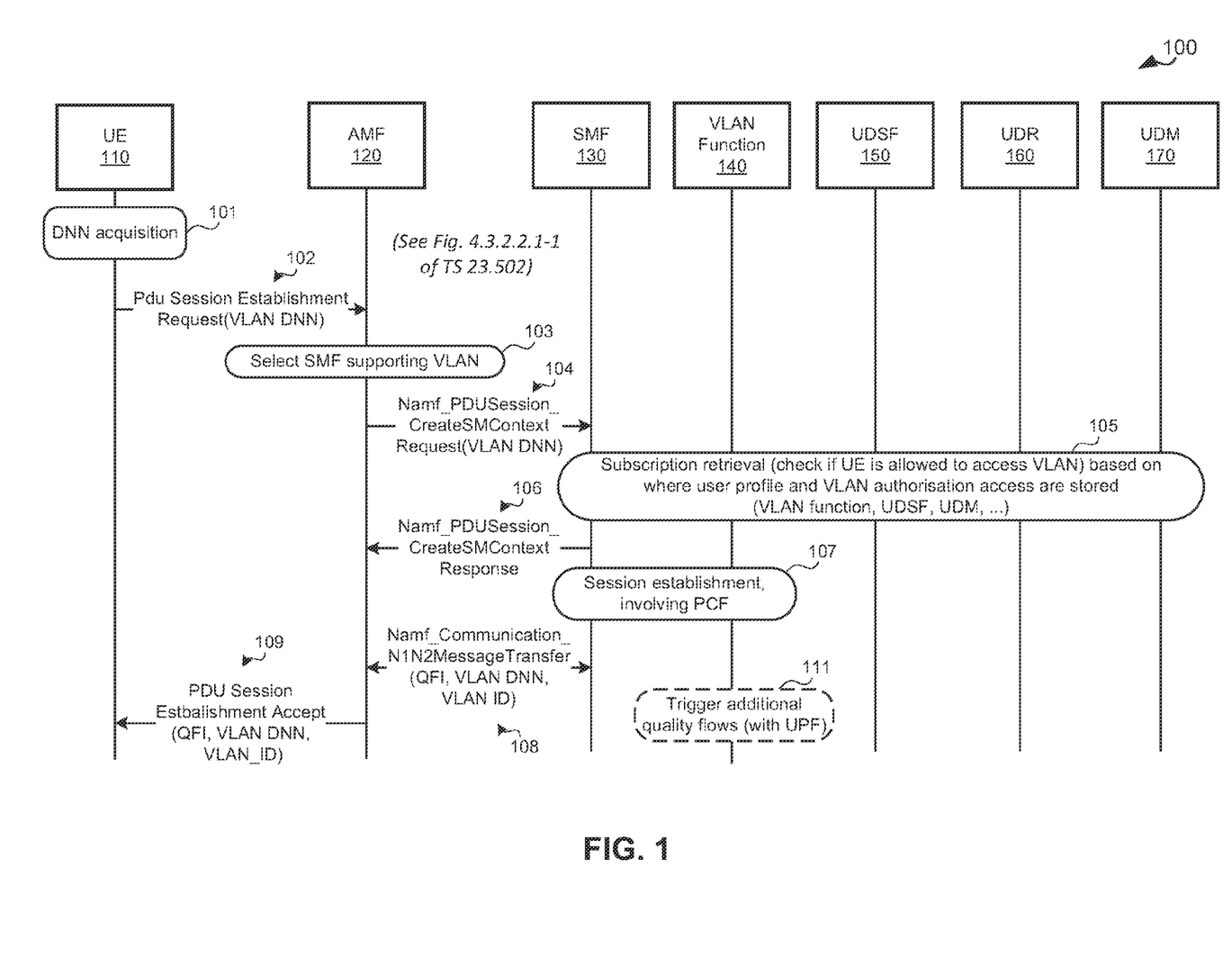
FIG. 1 illustrates an example process for PDU Session establishment according to various embodiments.

FIG. 1 illustrates an example process for PDU Session establishment according to various embodiments. In the example process shown, the UE 110 is provisioned with the DNN for which it is authorized to establish VLAN PDU sessions. The UE 103 may acquire the DNN using one or more of: (1) pre-provisioning in the management entity (ME), (2) provisioning in the Universal Mobile Telecommunications System (UMTS) subscriber identity module (USIM) card or a subscriber identity module (SIM) card, or (3) provisioning by way of an Open Mobile Alliance (OMA) Device Management (DM) (OMA-DM) interface. Other alternatives for provisioning the authorized a DNN include: (4) provisioning through Protocol Configuration Options (PCO) or extended PCO (ePCO) during a PDU session establishment; and/or (5) provisioning through a registration function interface exposed by UPF or other network function of the core network (e.g., the UE may resolve the IP of the VLAN registration function using a fully qualified domain name (FQDN) as part of a DNS query). Provisioning options 4 and 5 are discussed in more detail below.

At 102, the UE sends, to the AMF 120, a PDU Session Establishment Request that includes the VLAN DNN. The VLAN DNN can be part of the UL NAS Transport message carrying the PDU Session Establishment Request, or can be introduced in the PDU Session Establishment Request (this latter alternative involves a new Information Element that is added to the message). When the UE initiates PDU Session Establishment at 102 with the VLAN DNN (e.g., "enterprise DNN") where it wants to establish a VLAN session, the AMF 120 selects the session/slice management function (SMF) 130 supporting the VLAN, and sends, at 104, a CreateSMContext request in the form of a Namf_PDUSession_CreateSMContext Request to the SMF 130. The SMF 130 checks at 105 whether the UE is authorized for a VLAN establishment in conjunction with the VLAN function 140. The SMF 130 may check if the UE is authorized for VLAN establishment using UE subscription data stored in the Unified Data Management (UDM) function 170. The determination as to whether the UE 110 is authorized to establish a VLAN session can be performed in parts. For instance, according to one example, the SMF 130 may determine whether the UE is authorized for VLAN establishment for the given DNN, and the VLAN Function 140 may check/determine which VLAN ID the UE is authorized to use (either a default VLAN ID corresponding to the DNN or a particular VLAN ID requested by the UE) that it manages. The subscription retrieval may be based on where a user profile and VLAN authorisation access information are stored (e.g. VLAN function 140, Unstructured Data Storage Network Function (UDSF) 150, Unified Data Repository (UDR) 160, UDM 170, etc.).

If authentication is successful, then the SMF sends at 106 a CreateSMContext response in the form of a Namf_PDUSession_CreateSMContext Response to the AMF 120, a session is established at 107 involving the policy control function (PCF), and send Namf_Communication_N1N2MessageTransfer messages at 108 between the AMF 120 and the SMF 130. In some cases, on successful authentication of the UE 110's credentials for VLAN establishment, the VLAN function may interwork with the user plane function (UPF) to setup additional Quality Flows at 111. The VLAN function 140 selects the VLAN ID for setting up the packet filters and communicates this information to the SMF 130. The SMF 130 then provides the VLAN ID (and other information, e.g., QFI, VLAN DNN) to the AMF 120, which includes the VLAN ID in a PDU Session Establishment Accept sent to the UE 110 at 109.

Figure 2:
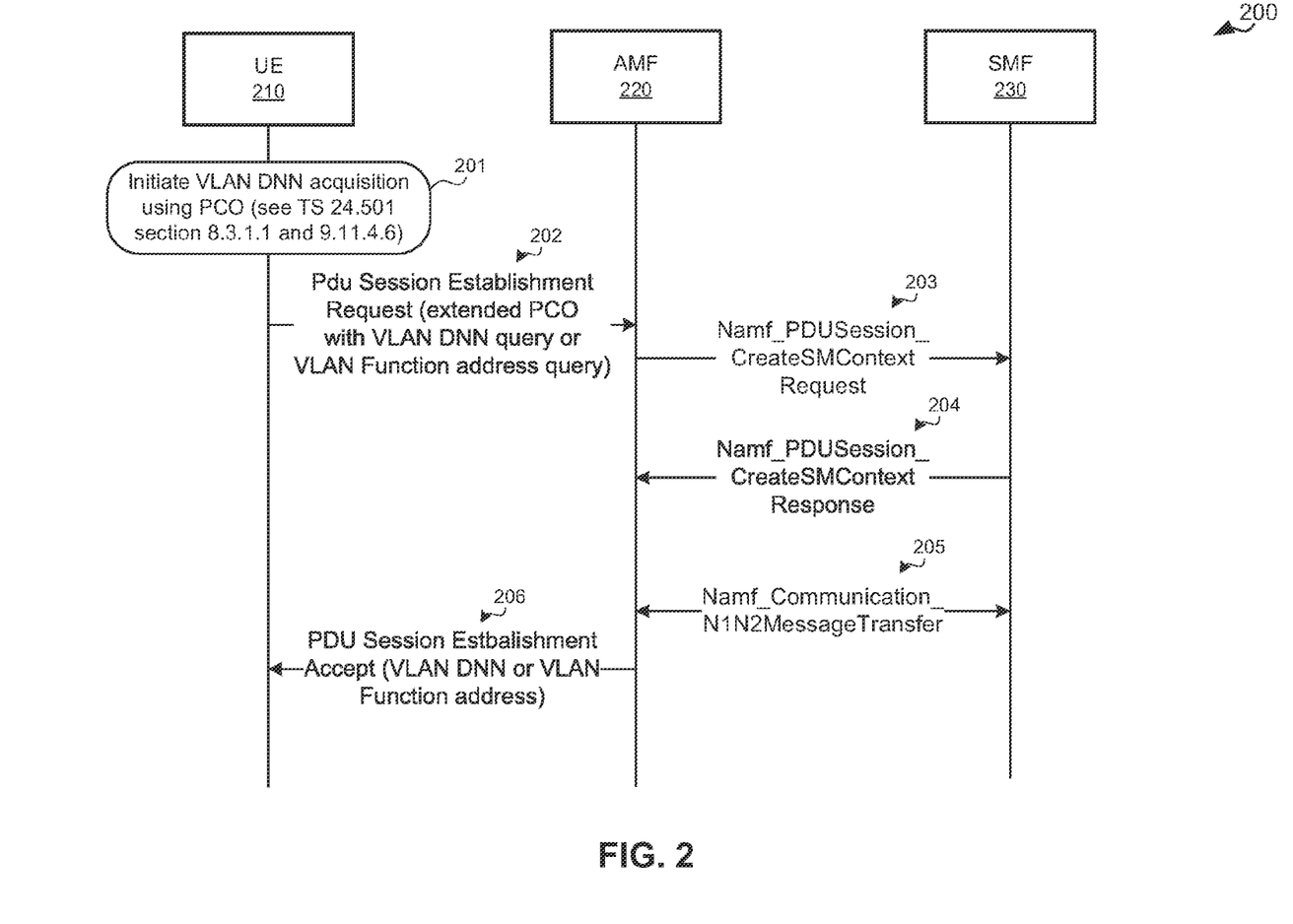
FIG. 2 illustrates an example process for VLAN DNN acquisition via PDU establishment request messages according to various embodiments.

FIG. 2 illustrates an example process for VLAN DNN acquisition via PDU establishment request messages according to various embodiments. In particular, the example shown in FIG. 2 illustrates VLAN DNN or address provisioning through PCO or ePCO during the PDU session establishment process. In this embodiment, the UE 210 initiates the process at 201 by including a "VLAN Request" field (indicating a request for the ULAN DNN or an address (e.g., IP address or FQDN) of the VLAN Function) in the additional parameters list in an extended PCO information element (IE) or ePCO IE. The extended PCO IE or ePCO IE is exchanged at 202 via a PDU Session establishment request that is sent to the AMF 220. The AMF 220 in turn sends a CreateSMContext request in the form of a Namf_PDUSession_CreateSMContext Request to the SMF 230, which in turn provides a CreateSMContext response in the form of a Namf_PDUSession_CreateSMContext Response at 204, and send Namf_Communication_N1N2MessageTransfer messages at 205. The SMF 230 provides the VLAN DNN in the PDU session establishment accept response message at 206. For additional info, the response may also be given in a ePCO information element (IE) part of the PDU session establishment accept response message. In some embodiments, the SMF 230 may provide an address of the VLAN Function (e.g., IP address or FQDN) to the UE 210 in the PDU session establishment accept response message at 206.

Figure 3A:
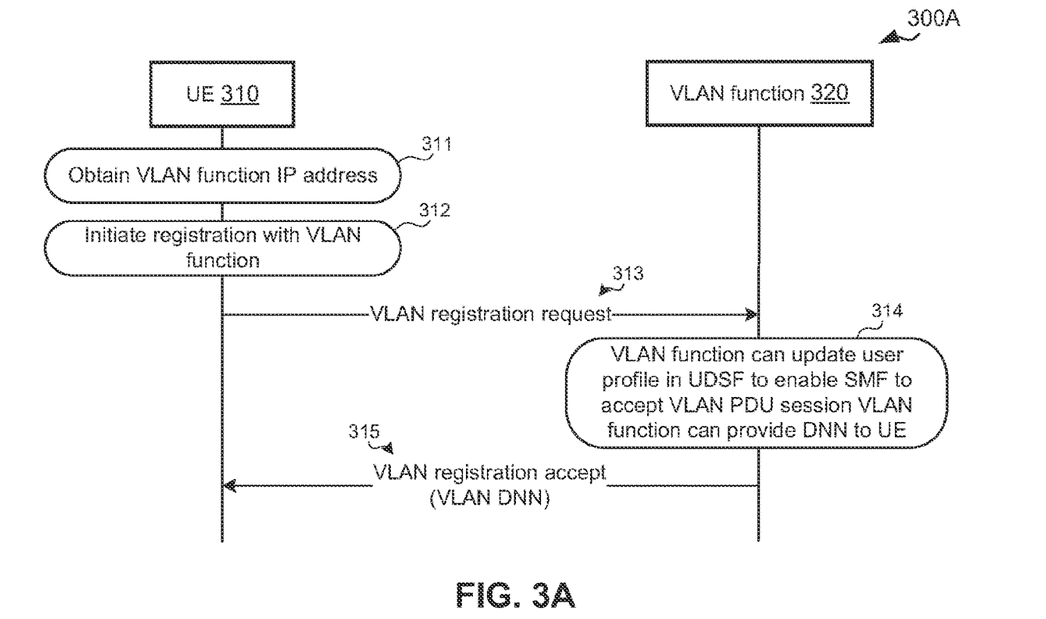
FIGS. 3A-3B illustrate example processes for direct VLAN DNN/VLAN ID acquisition via the VLAN Function according to various embodiments.
Figure 3B:
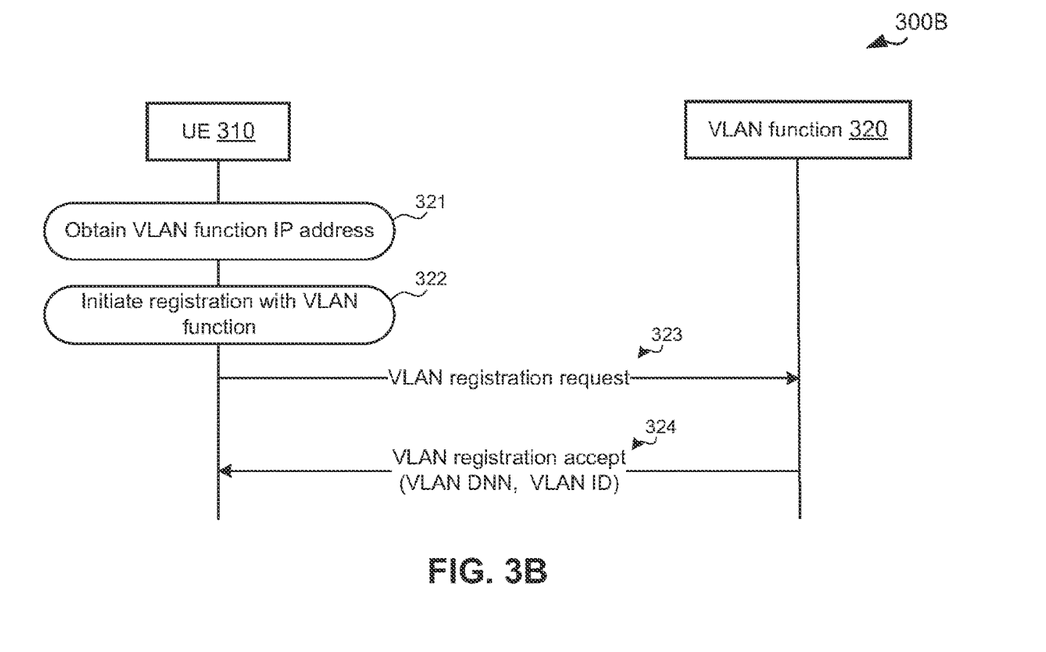

FIGS. 3A-3B illustrate example processes for direct VLAN DNN/VLAN ID acquisition via the VLAN Function according to various embodiments. In the examples shown, provisioning of the VLAN DNN or VLAN ID may be made through a registration function interface exposed by user plane function (UPF) (in which case the UE may, e.g., resolve the IP of the VLAN registration function using a fully qualified domain name (FQDN) in a DNS query). In the examples shown, the UE 310 does not know the VLAN DNN or VLAN ID information.

In the examples shown in FIGS. 3A-3B, the UE 310 first obtains the IP address of the VLAN Function at 311 and 321, respectively, initiates registration with the VLAN Function at 312 and 322, respectively, and sends a VLAN registration request to the VLAN Function at 313 and 323, respectively. In some embodiments, the UE 310 may obtain the VLAN Function IP address by setting a new VLAN request flag in the "additional parameter" list of the PCO or ePCO (see TS 24.008 V15.3.0 at 10.5.6.3). In other embodiments, the UE 310 may perform a domain name system (DNS) query for the VLAN function using a FQDN. In other embodiments, the UE may obtain the FQDN using a VLAN function FQDN request in the PCO, then the UE can trigger DNS query with VLAN function FQDN to obtain VLAN function IP address. Thus, there may be different request flags in the PCO or ePCO: (1) a VLAN DNN query flag to get VLAN DNN, and (2) a VLAN function address query flag to get the VLAN function IP address. The FQDN may be built with the following FQDN Framing rules. In one example, the FQDN could be in the form of vlan.mnc.mcc.3gppnetwork.org (see TS23.003 V15.0.0). In another example, this could be in the form of vlan.<enterprise tag>.mnc.mcc.3gppnetwork.org (e.g., where <enterprise tag> is provisioned or otherwise already stored in the UE 310). As a response to the DNS query, the UE is provided with the IP Address of the VLAN Function. With PCO or DNS as noted above, the UE may obtain the IP address of the VLAN function for registration. In other embodiments, the VLAN Function IP address may be provisioned in the UE 310, in a SIM card of the UE 310, or retrieved with OMA DM. Where the IP Address of the VLAN function is received by the UE 310 (e.g., via either of the two embodiments), the UE may use the registration function of the VLAN Function to retrieve the DNN/VLAN IDs that are authorized for the UE. Referring to FIG. 3A, the VLAN function 320 may first, at 314, update the profile in UDSF to enable SMF to accept the VLAN PDU session, and then may provide the VLAN DNN to the UE 310 at 315. Referring to FIG. 3B, the VLAN function 320 may provide the VLAN DNN or the VLAN ID to the UE 310 in a VLAN registration accept message at 324.

The PDU Session establishment process may be used to: establish a new PDU Session; handover a packet data network (PDN) connection in EPS to PDU Session in 5GS without a N26 interface; switch an existing PDU Session between non-3GPP access and 3GPP access; and/or request a PDU Session for emergency services. An example PDU session establishment process is shown in FIG. 4.3.2.2.1-1 of TS23.502 V15.2.0. Excerpts of TS23.502 V15.2.0 Section 4.3.2.2.1 are provided below.

"The procedure of 4.12.2.1-1 assumes that the UE has already registered on the AMF thus unless the UE is Emergency registered the AMF has already retrieved the user subscription data from the UDM. 1. From UE to AMF: NAS Message (S-NSSAI(s), DNN, PDU Session ID, Request type, Old PDU Session ID, N1 SM container (PDU Session Establishment Request)). In order to establish a new PDU Session, the UE generates a new PD: Session ID. The UE initiates the UE Requested PDU Session Establishment procedure by the transmission of a NAS message containing a PDU Session Establishment Request within the N1 SM container. The PDU Session Establishment Request includes a PDU session ID, Requested PDU Session Type, a Requested SSC mode, 5GSM Capability PCO, SM PDU DN Request Container, Number Of Packet Filters. . . . The PS Data Off status is included in the PCO in the PDU Session Establishment Request message."

According to one embodiment, the PCO or extended PCO may include a "VLAN Request" field to request provision authorized VLAN DNNs, and this feature may be inserted in TS23.502 V15.2.0 Section 4.3.2.2.1 after the last sentence in the above quote. TS523.502 V15.2.0 Section 4.3.2.2.1 further states with respect to its FIG. 4.3.2.2.1-1 that:

"3. From AMF to SMF: Either Nsmf_PDUSession_CreateSMContext Request (SUPI, DNN, S-NSSAI(s), PDU Session ID, AMF ID, Request Type, PCF ID, Priority Access, N1 SM container (PDU Session Establishment Request), User location information, Access Type, PEI, GPSI, UE presence in LADN service area, Subscription For PDU Session Status Notification, DNN Selection Mode, VLAN DNN) or Nsmf_PDUSession_UpdateSMContext Request (SUPI, DNN, S-NSSAI(s), PDU Session ID, AMF ID, Request Type, N1 SM container (PDU Session Establishment Request, VLAN DNN), User location information, Access Type, RAT type, PEI). If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with an SMF for the PDU Session ID provided by the UE (e.g. when Request Type indicates "existing PDU Session"), the AMF invokes the Nsmf_PDUSession_UpdateSMContext Request . . . . DNN Selection Mode is determined by the AMF. It indicates whether an explicitly subscribed DNN has been provided by the UE in its PDU Session Establishment Request. The SMF may use DNN Selection Mode when deciding whether to accept or reject the UE request."

According to one embodiment, the SMF may use the VLAN DNN to check whether the UE is authorized to establish a session with the given VLAN DNN. A VLAN Function, which may be part of the UPF, may check whether the UE is authorized for the requested VLAN ID (either a default VLAN ID corresponding to the DNN or the VLAN ID requested by the UE) that it manages. On successful authentication of a UE's credentials for VLAN establishment, the VLAN function may interwork with the UPF for setting up additional Quality Flows. The VLAN function may select a VLAN ID for setting up the packet filters and may communicate the selected VLAN ID and/or the packet filters to SMF. The above feature may be inserted in TS23.502 V15.2.0 Section 4.3.2.2.1 after the last sentence in the above quote. TS23.502 V15.2.0 Section 4.3.2.2.1 further states with respect to its FIG. 4.3.2.2.14 that:

"4 . . . . The SMF checks the validity of the UE request: it checks: Whether the UE request is compliant with the user subscription and with local policies; [and] (If the DNN corresponds to an LADN), whether the UE is located within the LADN service area based on the "UE presence in LADN service area" indication from the AMF. If the AMF does not provide the "UE presence in LADN service area" indication and the SMF determines that the DNN corresponds to a LADN, then the SMF considers that the UE is OUT of the LADN service area;"

According to one embodiment, the SMF further checks whether the UE is authorized for VLAN establishment for a given DNN. The VLAN Function checks whether the UE is authorized for the requested VLAN ID (either a default VLAN ID corresponding to the DNN or the VLAN ID requested by the UE) that it manages. On successful authentication of UE's credentials for VLAN establishment, the VLAN function may interwork with IJPF for setting up additional Quality Flows. The VLAN function selects the VLAN ID for setting up the packet filters and communicates to SMF. The above feature may be inserted in TS23.502 V15.2.0 Section 4.3.2.2.1 after the last sentence in the above quote. TS23.502 V15.2.0 Section 4.3.2.2.1 further states with respect to its FIG. 4.3.2.2.1-1 that:

"11. SMF to AMF: Namf_Communication_N1N2MessageTransfer (PDU Session ID, N2 SM information (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es)))). If multiple UPFs are used for the PDU Session, the CN Tunnel Info contain tunnel information related with the UPF that terminates N3 . . . . The Namf_Communication_N1N2MessageTransfer contains the PDU Session ID allowing the AMF to know which access towards the UE to use."

According to one embodiment, the Namf_Communication_N1N2MessageTransfer may contain an IP Address of a VLAN function within the PLMN when the PCO or extended PCO includes the "VLAN Request" field and the VLAN IDs selected by the VLAN function for setting up packet filters selected by the VLAN function. The above feature may be inserted in TS23.502 V15.2.0 Section 4.3.2.2.1 after the last sentence in the above quote. TS23.502 V15.2.0 Section 4.3.2.2.1 further states with respect to its FIG. 4.3.2.2.1-1 that:

"12. AMF to (R)AN: N2 PDU Session Request (N2 SM information, NAS message (PDU Session ID, N1 SM container (PDU Session Establishment Accept))). The AMF sends the NAS message containing PDU Session ID and PDU Session Establishment Accept targeted to the UE and the N2 SM information received from the SMF within the N2 PDU Session Request to the (R)AN."

According to one embodiment, The NAS message may contain the IP Address of a VLAN function within the PLMN when the PCO or extended PCO includes the "VLAN Request" field and the VLAN IDs selected by the VLAN function for setting up packet filters selected by the VLAN function. The above feature may be inserted in TS23.502 V15.2.0 Section 4.3.2.2.1 after the last sentence in the above quote.

FIG. 4 illustrates an example process 400 for providing a VLAN ID to a UE device according to various embodiments. Operations in the example process 400 may be performed by one or more components of a core network (e.g., one or more components shown in, and described with respect to, FIG. 1 or 6), and, in certain cases, may be encoded in computer-readable media as instructions executable by processing circuitry of one or more servers implementing the logical entities of the core network. The example process 400 may include additional or different operations, and the operations may be performed in the order shown or in another order. In some cases, one or more of the operations shown in FIG. 4 are implemented as processes that include multiple operations, sub-processes, or other types of routines. In some cases, operations can be combined, performed in another order, performed in parallel, iterated, or otherwise repeated or performed another manner.

At 402, a UE device is provisioned with a VLAN DNN. The VLAN DNN may be provisioned on the UE device according to one of the embodiments described above. At 404, a request for a VLAN ID is received from the UE. The request includes the VLAN DNN provisioned at 402. At 406, it is determined whether the UE device is authorized to access a particular VLAN associated with the VLAN DNN). If the UE device is authorized to access the VLAN, then the VLAN ID corresponding to the particular VLAN is provided to the UE.

FIG. 5 illustrates an example architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell), The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with same embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN, In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (CPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525, The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
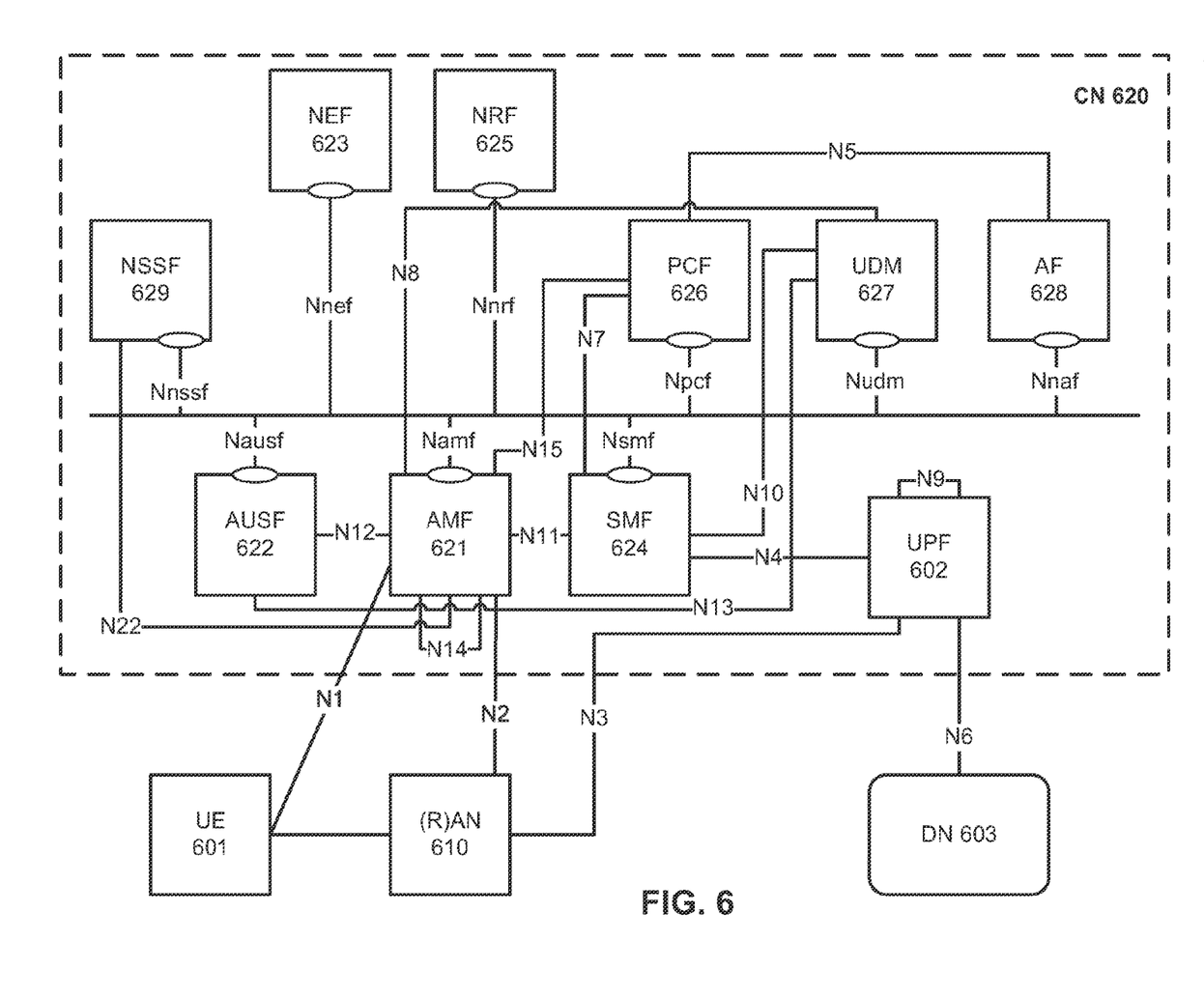
FIG. 6 illustrates an example architecture of a system including a core network in accordance with various embodiments.

FIG. 6 illustrates an example architecture of a system 600 including a core network (CN) 620 in accordance with various embodiments. The CN 620 may be a core network for a 5G System (which may be referred to as a 5GC). The system 600 is shown to include a UE 601, which may be the same or similar to the UEs 110, 210, 310, 501, 502 discussed previously; a (R)AN 610, which may be the same or similar to the RAN 510 discussed previously, and which may include RAN nodes 511, 512 discussed previously; and a DN 603, which may be, for example, operator services, Internet access, or 3rd party services; and a CN 620. The CN 620 may include a number of network functions including an AUSF 622; an AMF 621; a SMF 624; a NEF 623; a PCF 626; a NRF 625; a UDM 627; an AF 628; a UPF 602; and a NSSF 629. These network functions may be implemented, in some cases, as virtualized software-based functions/services.

The UPF 602 may act as an anchor point for intra-RAT and inter-RAT mobility, an external PDU session point of interconnect to DN 603, and a branching point to support mufti-homed PDU session. The UPF 602 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 602 may include an uplink classifier to support routing traffic flows to a data network, The DN 603 may represent various network operator services, Internet access, or third party services. DN 603 may include, or be similar to, application server 430 discussed previously. The UPF 602 may interact with the SMF 624 via an N4 reference point between the SMF 624 and the UPF 602.

The AUSF 622 may store data for authentication of UE 601 and handle authentication-related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 may be responsible for registration management (e.g., for registering UE 601, etc.), connection management, reachability management, mobility management, and lawful interception of AMF-related events, and access authentication and authorization. The AMF 621 may be a termination point for the an N11 reference point between the AMF 621 and the SMF 624. The AMF 621 may provide transport for SM messages between the UE 601 and the SMF 624, and act as a transparent proxy for routing SM messages. AMF 621 may also provide transport for SMS messages between UE 601 and an SMSF (not shown by FIG. 6). AMF 621 may act as SEAF, which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a SCM function, which receives a key from the SEA that it uses to derive access-network specific keys. Furthermore, AMF 621 may be a termination point of a RAN CP interface, which may include or be an N2 reference point between the (R)AN 610 and the AMF 621; and the AMF 621 may be a termination point of NAS (N1) signalling, and perform NAS ciphering and integrity protection.

AMF 621 may also support NAS signalling with a UE 601 over an N3IWF interface. The N3IWF may be used to provide access to untrusted entities. N3IWF may be a termination point for the N2 interface between the (R)AN 610 and the AMF 621 for the control plane, and may be a termination point for the N3 reference point between the (R)AN 610 and the UPF 602 for the user plane. As such, the AMF 621 may handle N2 signalling from the SMF 624 and the AMF 621 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 621 and an N17 reference point between the AMF 621 and a 5G-EIR (not shown by FIG. 6).

The UE 601 may need to register with the AMF 621 in order to receive network services. RM is used to register or deregister the UE 601 with the network (e.g., AMF 621), and establish a UE context in the network (e.g., AMF 621). The UE 601 may operate in an RM-REGISTERED state or an RM-DEREGISTERED state. In the RM DEREGISTERED state, the UE 601 is not registered with the network, and the UE context in AMF 621 holds no valid location or routing information for the UE 601 so the UE 601 is not reachable by the AMF 621. In the RM REGISTERED state, the UE 601 is registered with the network, and the UE context in AMF 621 may hold a valid location or routing information for the UE 601 so the UE 601 is reachable by the AMF 621. In the RM-REGISTERED state, the UE 601 may perform mobility Registration Update procedures, perform periodic Registration Update procedures triggered by expiration of the periodic update timer (e.g., to notify the network that the UE 601 is still active), and perform a Registration Update procedure to update UE capability information or to re-negotiate protocol parameters with the network, among others.

The AMF 621 may store one or more RM contexts for the UE 601, where each RM context is associated with a specific access to the network. The RM context may be a data structure, database object, etc. that indicates or stores, inter alia, a registration state per access type and the periodic update timer. The AMF 621 may also store a 5GC MM context that may be the same or similar to the (E)MM context discussed previously. In various embodiments, the AMF 621 may store a CE mode B Restriction parameter of the UE 601 in an associated MM context or RM context. The AMF 621 may also derive the value, when needed, from the UE's usage setting parameter already stored in the UE context (and/or MM/RM context).

CM may be used to establish and release a signaling connection between the UE 601 and the AMF 621 over the N1 interface. The signaling connection is used to enable NAS signaling exchange between the UE 601 and the CN 620, and comprises both the signaling connection between the UE and the AN (e.g., RRC connection or UE-N3IWF connection for non-3GPP access) and the N2 connection for the UE 601 between the AN (e.g., AN 610) and the AMF 621. The UE 601 may operate in one of two CM states, CM-IDLE mode or CM-CONNECTED mode. When the UE 601 is operating in the CM-IDLE state/mode, the UE 601 may have no NAS signaling connection established with the AMF 621 over the N1 interface, and there may be (R)AN 610 signaling connection (e.g., N2 and/or N3 connections) for the UE 601. When the UE 601 is operating in the CM-CONNECTED state/mode, the UE 601 may have an established NAS signaling connection with the AMF 621 over the N1 interface, and there may be a (R)AN 610 signaling connection (e.g., N2 and/or N3 connections) for the UE 601. Establishment of an N2 connection between the (R)AN 610 and the AMF 621 may cause the UE 601 to transition from CM-IDLE mode to CM-CONNECTED mode, and the UE 601 may transition from the CM-CONNECTED mode to the CM-IDLE mode when N2 signaling between the (R)AN 610 and the AMF 621 is released.

The SMF 624 may be responsible for SM session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 601 and a data network (DN) 603 identified by a Data Network Name (DNN). PDU sessions may be established upon UE 601 request, modified upon UE 601 and CN 620 request, and released upon UE 601 and CN 620 request using NAS SM signaling exchanged over the N1 reference point between the UE 601 and the SMF 624. Upon request from an application server, the CN 620 may trigger a specific application in the UE 601. In response to receipt of the trigger message, the UE 601 may pass the trigger message (or relevant parts/information of the trigger message) to one or more identified applications in the UE 601. The identified application(s) in the UE 601 may establish a PDU session to a specific DNN. The SMF 624 may check whether the UE 601 requests are compliant with user subscription information associated with the UE 601. In this regard, the SMF 624 may retrieve and/or request to receive update notifications on SMF 624 level subscription data from the UDM 627.

The SMF 624 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 624 may be included in the system 600, which may be between another SMF 624 in a visited network and the SMF 624 in the home network in roaming scenarios. Additionally, the SMF 624 may exhibit the Nsmf service-based interface.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFS. NEF 623 may also translate information exchanged with the AF 628 and information exchanged with internal network functions. For example, the NEF 623 may translate between an AF-Service-Identifier and an internal SCC information. NEF 623 may also receive information from other network functions (NFs) based on exposed capabilities of other network functions. This information may be stored at the NEF 623 as structured data, or at a data storage NF using standardized interfaces. The stored information can then be re-exposed by the NEF 623 to other NFs and AFs, and/or used for other purposes such as analytics. Additionally, the NEF 623 may exhibit an Nnef service-based interface.

The NRF 625 may support service discovery functions, receive NF discovery requests from NF instances, and provide the information of the discovered NF instances to the NF instances. NRF 625 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 625 may exhibit the Nnrf service-based interface.

The PCF 626 may provide policy rules to control plane function(s) to enforce them, and may also support unified policy framework to govern network behaviour. The PCF 626 may also implement a front end (FE) to access subscription information relevant for policy decisions in a UDR of the UDM 627. The PCF 626 may communicate with the AMF 621 via an N15 reference point between the PCF 626 and the AMF 621, which may include a PCF 626 in a visited network and the AMF 621 in case of roaming scenarios. The PCF 626 may communicate with the AF 628 via an N5 reference point between the PCF 626 and the AF 628; and with the SMF 624 via an N7 reference point between the PCF 626 and the SMF 624, The system 600 and/or CN 620 may also include an N24 reference point between the PCF 626 (in the home network) and a PCF 626 in a visited network, Additionally, the PCF 626 may exhibit an Npcf service-based interface.

The UDM 627 may handle subscription-related information to support the network entities' handling of communication sessions, and may store subscription data of UE 601. For example, subscription data may be communicated between the UDM 627 and the AMF 621 via an N8 reference point between the UDM 627 and the AMF. The UDM 627 may include two parts, an application FE and a UDR (the FE and UDR are not shown by FIG. 6). The UDR may store subscription data and policy data for the UDM 627 and the PCF 626, and/or structured data for exposure and application data (including PFDs for application detection, application request information for multiple UEs 601) for the NEF 623. The Nudr service-based interface may be exhibited by the UDR 221 to allow the UDM 627, PCF 626, and NEF 623 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 624 via an N10 reference point between the UDM 627 and the SMF 624. UDM 627 may also support SMS management, wherein an SMS-FE implements the similar application logic as discussed previously. Additionally, the UDM 627 may exhibit the Nudm service-based interface.

The AF 628 may provide application influence on traffic routing, provide access to the NCE, and interact with the policy framework for policy control. The NCE may be a mechanism that allows the CN 620 and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 502 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs. Additionally, the AF 628 may exhibit an Naf service-based interface.

The NSSF 629 may select a set of network slice instances serving the UE 501. The NSSF 629 may also determine allowed NSSAI and the mapping to the subscribed S-NSSAIs, if needed. The NSSF 629 may also determine the AMF set to be used to serve the UE 601, or a list of candidate AMF(s) 621 based on a suitable configuration and possibly by querying the NRF 625. The selection of a set of network slice instances for the UE 601 may be triggered by the AMF 621 with which the UE 601 is registered by interacting with the NSSF 629, which may lead to a change of AMF 621. The NSSF 629 may interact with the AMF 621 via an N22 reference point between AMF 621 and NSSF 629; and may communicate with another NSSF 629 in a visited network via an N31 reference point (not shown by FIG. 6). Additionally, the NSSF 629 may exhibit an Nnssf service-based interface.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for a notification procedure that the UE 601 is available for SMS transfer (e.g., set a UE not reachable flag, and notifying UDM 627 when UE 601 is available for SMS).

The CN 620 may also include other elements that are not shown by FIG. 6, such as a Data Storage system/architecture, a 5G-EIR, a SEPP, and the like. The Data Storage system may include a SDSF, air UDSF, and/or the like. Any NF may store and retrieve unstructured data into/from the UDSF (e.g., UE contexts), via N18 reference point between any NF and the UDSF (not shown by FIG. 6). Individual NFs may share a UDSF for storing their respective unstructured data or individual NFs may each have their own UDSF located at or near the individual NFs. Additionally, the UDSF may exhibit an Nudsf service-based interface (not shown by FIG. 6). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 6 for clarity. In one example, the CN 620 may include an Nx interface, which is an inter-CN interface between the MME (e.g., MME 521) and the AMF 621 in order to enable interworking between CN 620 and CN 520. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

The following examples pertain to certain embodiments. It will be understood that certain examples listed below may be combined with other examples, or certain aspects of other examples. The examples listed below may be performed by one or more components or logical entities of a core network (e.g., those shown in FIGS. 1 and 6).

Example 1 includes New Radio (NR) core network system comprising: memory comprising instructions; and one or more processors to execute the instructions to implement a set of network functions to: receive a request from a user equipment (UE) device comprising a virtual local area network data network name (VLAN DNN); determine whether the UE device is authorized to access a particular VLAN implemented on the core network and associated with the VLAN DNN; and cause a message comprising a VLAN identifier (VLAN ID) to be transmitted to the UE device based on a determination that the UE device is authorized to access the particular VLAN, wherein the VLAN ID corresponds to the particular VLAN.

Example 2 includes the subject matter of Example 1, and optionally, wherein the VLAN DNN is obtained from the UE device via a packet data unit (PDU) session establishment request, and the VLAN ID is to be transmitted to the UE device via a PDU session establishment accept message.

Example 3 includes the subject matter of Example 1 or 2, and optionally, wherein the set of network functions includes an access and mobility management function (AMF) and a session/slice management function (SMF), and the one or more processors are to implement the AMF to select the SMF based on a determination that the SMF supports the particular VLAN.

Example 4 includes the subject matter of Example 1 or 2, and optionally, wherein the one or more processors are to implement the AMF to send a Namf_PDUSession_CreateSMContext Request to the SMF comprising the VLAN DNN.

Example 5 includes the subject matter of Example 1 or 2, and optionally, wherein the one or more processors are further to implement the SMF to send a Namf_Communication_N1N2MessageTransfer message to the AMF comprising the VLAN ID.

Example 6 includes the subject matter of Example 1 or 2, and optionally, wherein the set of network functions further includes a VLAN Function that manages the particular VLAN, and the one or more processors are to implement the SMF to determine whether the UE device is authorized to access the particular VLAN in conjunction with the VLAN Function.

Example 7 includes the subject matter of Example 6, and optionally, wherein the one or more processors are to implement the VLAN function to select the VLAN ID, setup packet filters, and communicate the VLAN ID and the packet filters to the SMF.

Example 8 includes the subject matter of Example 6, and optionally, wherein the set of network functions further includes a user plane function (UPF), and the one or more processors are to implement the VLAN function to interwork with the UPF to setup one or more quality flows.

Example 9 includes the subject matter of Example 1 or 2, and optionally, wherein the one or more processors are to implement the network functions to provision the UE device with the VLAN DNN in response to receiving a request from the UE device comprising a VLAN DNN query as a protocol configuration option (PCO) or extended PCO (ePCO).

Example 10 includes the subject matter of Example 9, and optionally, wherein the one or more processors are to provision the UE device using a PDU session establishment accept message that is based on a packet data unit (PDU) session establishment request sent by the UE device.

Example 11 includes the subject matter of Example 1 or 2, and optionally, wherein the set of network functions includes a VLAN function, and the one or more processors are to implement the network functions to provision the UE device with an address of the VLAN Function in response to receiving a request from the UE device comprising a VLAN DNN query or VLAN Function FQDN query as a protocol configuration option (PCO) or extended PCO (ePCO).

Example 12 includes the subject matter of Example 1, and optionally, wherein the set of network functions includes a VLAN Function, and the one or more processors are to implement the VLAN Function to transmit the message comprising the VLAN ID to the UE device based on the UE device registering with the VLAN Function through a registration function interface exposed by one of the network functions.

Example 13 includes the subject matter of Example 12, and optionally, wherein the one or more processors are further to provide an address of the VLAN Function to the UE device based on a request from the UE device comprising a protocol configuration option (PCO) or extended PCO (ePCO) indicating a request for the address of the VLAN function.

Example 14 includes the subject matter of Example 13, and optionally, wherein the PCO or ePCO comprises a VLAN request flag to indicate the request for the address of the VLAN function.

Example 15 includes the subject matter of Example 12, and optionally, wherein the one or more processors are further to provide an address of the VLAN Function to the UE device based on a domain name service (DNS) query comprising a fully qualified domain name (FQDN) of the VLAN Function.

Example 16 includes the subject matter of Example 15, and optionally, wherein the FQDN comprises an enterprise tag for the particular VLAN.

Example 17 includes the subject matter of Example 12, and optionally, wherein the set of network functions further includes a session/slice management function (SW), and the one or more processors are further to implement the VLAN function to enable the SMF to accept a VLAN PDU session from the UE device.

Example 18 includes method to be performed by a set of network functions of a New Radio (NR) core network system, the method comprising: receiving a request from a user equipment (LW) device comprising a virtual local area network data network name (VLAN DNN); determining whether the UE device is authorized to access a particular VLAN implemented on the core network and associated with the VLAN DNN; and transmitting a message comprising a VLAN identifier (VLAN ID) to the UE device based on a determination that the UE device is authorized to access the particular VLAN, wherein the VLAN ID corresponds to the particular VLAN.

Example 19 includes the subject matter of Example 18, and optionally, wherein the set of network functions includes an access and mobility management function (AMF) to receive the request from the UE device in a packet data unit (PDU) session establishment request, and a session/slice management function (SMF) to determine whether the UE device is authorized to access the particular VLAN and transmit the message comprising the VLAN ID to the UE device as a packet data unit (PDU) session establishment accept message.

Example 20 includes the subject matter of Example 18 or 19, and optionally, further comprising provisioning the UE device with the VLAN DNN in response to receiving a request from the UE device comprising a VLAN DNN query or VLAN Function FQDN query as a protocol configuration option (PCO) or extended PCO (ePCO).

Example 21 includes the subject matter of Example 18 or 19, and optionally, wherein the set of network functions includes a VLAN Function, and the method further comprises provisioning the UE device with an address of the VLAN Function in response to receiving a request from the UE device comprising a VLAN DNN query as a protocol configuration option (PCO) or extended PCO (ePCO).

Example 22 includes the subject matter of Example 18, and optionally, wherein the set of network functions includes a VLAN Function, and the VLAN Function transmits the message comprising the VLAN ID to the UE device based on the UE device registering with the VLAN Function through a registration function interface exposed by one of the network functions.

Example 23 includes the subject matter of Example 22, and optionally, further comprising providing an address of the VLAN Function to the UE device based on a request from the UE device comprising a protocol configuration option (PCO) or extended PCO (ePCO) indicating a request for the address of the VLAN function.

Example 24 includes the subject matter of Example 21, and optionally, further comprising providing an address of the VLAN Function to the UE device based on a domain name service (DNS) query comprising a fully qualified domain name (FQDN) of the VLAN Function.

Example 25 includes the subject matter of Example 19, and optionally, further comprising selecting, by the AMF, the SMF based on a determination that the SMF supports the particular VLAN.

Example 26 includes the subject matter of Example 19, and optionally, further comprising sending, by the AMF, a Namf_PDUSession_CreateSMContext Request to the SMF comprising the VLAN DNN.

Example 27 includes the subject matter of Example 19, and optionally, further comprising sending, by the SMF, a Namf_Communication_N1N2MessageTransfer message to the AMF comprising the VLAN ID.

Example 28 includes the subject matter of Example 19, and optionally, wherein the set of network functions further includes a VLAN Function, and the method further comprises determining, by the SMF in conjunction with the VLAN Function, whether the UE device is authorized to access the particular VLAN.

Example 29 includes the subject matter of Example 29, and optionally, further comprising, by the VLAN function, selecting the VLAN ID, setting up packet filters, and communicating the VLAN ID and the packet filters to the SMF.

Example 30 includes the subject matter of Example 29, and optionally, wherein the set of network functions further includes a user plane function (UPF), and the method further comprises, by the VLAN function and the UPF, setting up one or more quality flows.

Example 31 includes the subject matter of Example 20 or 21, and optionally, wherein provisioning the UE device is done using a PDU session establishment accept message that is based on a packet data unit (PDU) session establishment request sent by the UE device.

Example 32 includes the subject matter of Example 23, and optionally, wherein the PCO or ePCO comprises a VLAN request flag to indicate the request for the address of the VLAN function.

Example 33 includes the subject matter of Example 24, and optionally, wherein the FQDN comprises an enterprise tag for the particular VLAN.

Example 34 includes the subject matter of Example 22, and optionally, wherein the set of network functions further includes a session/slice management function (SMF), and the method further comprises enabling, by the VLAN function, the SMF to accept a VLAN PDU session from the UE device.

Example 35 includes product comprising one or more tangible computer-readable non-transitory storage media comprising computer-executable instructions operable to, when executed by at least one computer processor, enable the at least one computer processor to perform the method of any one of Examples 18-33.

Example 36 includes a system or apparatus comprising means to perform the method of any one of Examples 18-33.

Example 37 includes the subject matter of any preceding example, and optionally, wherein the set of network functions includes at least one of a an access and mobility management function (AM), a session/slice management function (SMF), a VLAN Function, an Unstructured Data Storage Network Function (UDSF), a Unified Data Repository (UDR), a Unified Data Management (UDM), and a user plane function (UPF).

Example 38 includes an apparatus of a New Radio (NR) User Equipment device, the apparatus comprising memory and one or more processors to: cause a request comprising a virtual local area network data network name (VLAN DNN) to be transmitted to a core network (CN); obtain a VLAN identifier (VLAN ID) from the CN in response to the request; and process data received based on the VLAN ID.

Example 39 includes the subject matter of Example 38, and optionally, wherein the request is a packet data unit (PDU) session establishment request, and the VLAN ID is obtained via a PDU session establishment accept message.

Example 40 includes the subject matter of Examples 38 or 39, and optionally, wherein the one or more processors are further to cause a request for the VLAN DNN to be transmitted to the CN, the request comprising a VLAN DNN query or VLAN Function FQDN query as a protocol configuration option (PCO) or extended PCO (ePCO); and receive the VLAN DNN or VLAN Function FQDN from the CN based on the request.

Example 41 includes the subject matter of Examples 38 or 39, and optionally, wherein the one or more processors are further to obtain the VLAN DNN or VLAN ID based on registering with the VLAN Function through a registration function interface exposed by a network function of the CN.

Example 42 may include a device comprising logic, modules, circuitry, or other means to perform one or more elements of a method described in or related to any of the examples above or any other method or process described herein.

Example 43 may include a signal as described in or related to any of the Examples above, or portions or parts thereof.

Example 44 may include a signal in a wireless network as shown and described herein.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus for a New Radio (NR) core network system, the apparatus comprising:
    memory comprising instructions; and
    one or more processors to execute the instructions to implement an access and mobility function (AMF) to:
    receive a request from a user equipment (UE) device comprising a virtual local area network data network name (VLAN DNN);
    select a session/slice management function (SMF) based on a determination that the SMF supports a particular VLAN implemented on the NR core network system and associated with the VLAN DNN;
    cause the SMF to determine whether the UE device is authorized to access the particular VLAN; and
    transmit a message comprising a VLAN identifier (VLAN ID) to the UE device based on the determination by the SMF that the UE device is authorized to access the particular VLAN, wherein the VLAN ID corresponds to the particular VLAN.

2. The apparatus of claim 1, wherein the VLAN DNN is obtained from the UE device via a packet data unit (PDU) session establishment request, and the VLAN ID is to be transmitted to the UE device via a PDU session establishment accept message.

3. The apparatus of claim 1, wherein the one or more processors are to implement the AMF to send a Namf_PDUSession_CreateSMContext Request to the SMF comprising the VLAN DNN.

4. The apparatus of claim 1, wherein the one or more processors are to implement the AMF to receive a Namf_Communication_NIN2MessageTransfer message from the SMF, wherein the Namf_Communication_NIN2MessageTransfer message comprises the VLAN ID.

5. The apparatus of claim 1, wherein the one or more processors are to implement the AMF to provide the VLAN DNN to the UE device in response to receiving a request from the UE device comprising a VLAN DNN query as a protocol configuration option (PCO) or extended PCO (ePCO).

6. The apparatus of claim 1, wherein the one or more processors are to implement the AMF to provide an address of a VLAN Function to the UE device based on a request from the UE device comprising a protocol configuration option (PCO) or extended PCO (ePCO) indicating a request for the address of the VLAN function.

7. The apparatus of claim 6, wherein the PCO or ePCO comprises a VLAN request flag to indicate the request for the address of the VLAN function.

8. A method to be performed by an access and mobility management function (AMF) of a New Radio (NR) core network system, the method comprising:
    receiving a request from a user equipment (UE) device comprising a virtual local area network data network name (VLAN DNN);
    selecting a session/slice management function (SMF) based on a determination that the SMF supports a particular VLAN implemented on the NR core network system and associated with the VLAN DNN;
    causing the SMF to determine whether the UE device is authorized to access the particular VLAN; and
    transmitting a message comprising a VLAN identifier (VLAN ID) to the UE device based on the determination by the SMF that the UE device is authorized to access the particular VLAN, wherein the VLAN ID corresponds to the particular VLAN.

9. The method of claim 8, further comprising providing the VLAN DNN to the UE device in response to receiving a request from the UE device comprising a VLAN DNN query as a protocol configuration option (PCO) or extended PCO (ePCO).

10. The method of claim 8, wherein the message is transmitted in response to receiving a request from the UE device comprising a VLAN DNN query as a protocol configuration option (PCO) or extended PCO (ePCO).

11. The method of claim 8, further comprising providing an address of a VLAN Function to the UE device based on a request from the UE device comprising a protocol configuration option (PCO) or extended PCO (ePCO) indicating a request for the address of the VLAN function.

12. A computer-readable non-transitory storage medium comprising computer-executable instructions operable to, when executed by at least one computer processor, enable the at least one computer processor to perform the method of claim 8.

13. A computer-readable non-transitory storage medium comprising computer-executable instructions operable to, when executed by at least one computer processor, enable the at least one computer processor to perform the method of claim 9.

14. A computer-readable non-transitory storage medium comprising computer-executable instructions operable to, when executed by at least one computer processor, enable the at least one computer processor to perform the method of claim 10.

15. A computer-readable non-transitory storage medium comprising computer-executable instructions operable to, when executed by at least one computer processor, enable the at least one computer processor to perform the method of claim 13.

\* \* \* \* \*